US006239910B1

(12) United States Patent
Digert

(10) Patent No.: US 6,239,910 B1
(45) Date of Patent: May 29, 2001

(54) MINI-OPTICAL LIGHT SHELF DAYLIGHTING SYSTEM

(75) Inventor: Neall Edward Digert, Westminster, CO (US)

(73) Assignee: Architectural Energy Corporation, Boulder, CO (US)

( * ) Notice: Subject to any disclaimer, the term of this patent is extended or adjusted under 35 U.S.C. 154(b) by 0 days.

(21) Appl. No.: 09/249,664

(22) Filed: Feb. 12, 1999

(51) Int. Cl.[7] .......................... G02B 17/00; G02B 27/00; A47H 1/00; E06B 9/08

(52) U.S. Cl. .......................... 359/596; 359/597; 160/104

(58) Field of Search .................................... 359/591, 593, 359/594, 596, 597; 160/104

(56) References Cited

U.S. PATENT DOCUMENTS

| | | | | |
|---|---|---|---|---|
| 4,040,725 | * | 8/1977 | Goodbar | 350/263 |
| 4,351,588 | * | 9/1982 | Züllig | 350/259 |
| 4,509,825 | * | 4/1985 | Otto et al. | 350/259 |
| 4,517,960 | * | 5/1985 | Bartenbach | 126/440 |
| 4,557,565 | | 12/1985 | Ruck et al. | 350/262 |
| 4,634,222 | * | 1/1987 | Critten | 350/263 |
| 4,883,340 | | 11/1989 | Dominguez | 359/593 |
| 5,285,315 | | 2/1994 | Stiles | 359/592 |
| 5,293,305 | | 3/1994 | Koster | 362/147 |
| 5,648,873 | * | 7/1997 | Jaster et al. | 359/591 |
| 5,802,784 | * | 9/1998 | Federmann | 52/204.5 |

OTHER PUBLICATIONS

Innovative Daylighting: Review of Systems and Evaluation Methods, Littlefair, Paul J. MA, PhD, vol. 22 No. 1, pp. 1–17.*

* cited by examiner

*Primary Examiner*—Christopher E. Mahoney
(74) *Attorney, Agent, or Firm*—Dutz, Graziano & Forest, P.C.

(57) ABSTRACT

The mini-optical light shelf is a daylighting system implemented in the paradigm of a window treatment that is applicable to both new installations as well as existing window glazing. In particular, the mini-optical light shelf is a passive, static optical device which receives daylight transmitted through a window and efficiently redirects it onto the interior ceiling surface in a diffuse manner, thereby creating a useful source of interior illumination. The mini-optical light shelf includes multiple shelves, each of which contains an optically shaped top surface to allow light to be efficiently collected and accurately directed onto the ceiling surface. The optical elements are narrow and can be implemented in the paradigm of a window treatment. The window area is partitioned into a view related glazing section and a daylight collection and redirection glazing area. The occupant's views out of the building remain relatively unobstructed through the view related area of the glazing to a height of approximately seven feet. Traditional window treatments can be used for this portion of the glazing for shading, privacy, and blackout control. The sunlight incident on the daylight collection area of the glazing is collected and redirected onto the ceiling plane in a glare free manner.

43 Claims, 10 Drawing Sheets

MINI-OPTICAL LIGHT SHELF DAYLIGHTING SYSTEM

FIELD OF THE INVENTION

This invention relates to interior space illumination systems and, in particular, to a mini-optical light shelf daylighting system that implements an efficient daylighting system in the paradigm of a window treatment to redirect incident sunlight into an interior space and on to the ceiling plane to illuminate the interior space.

PROBLEM

It is a problem in the field of interior space illumination to provide a cost effective mode of illumination that makes use of the incident sunlight without the need for complex systems or significant occupant intervention. Existing daylighting systems are either of limited effectiveness, limited applicability due to their architectural limitations, or require complex and expensive mechanical and electronic control mechanisms.

Each year in the United States, over $350 billion is spent on energy for residential, commercial, and industrial buildings. Of this amount, more than $212 billion was spent during 1996 to purchase electricity, with 32% of that amount being used to operate commercial buildings: office, retail, institutional, but not industrial. Of this use, approximately 35% of the electricity consumption was related to lighting and another 6% was attributable to the air conditioning energy required to remove the excess heat generated by electric lighting. Thus, lighting is typically the largest end-use for electricity, annually consuming approximately 310 billion kWh.

There is a need for systems that provide improved energy efficiency and environmental quality. One such example is the need to reduce the consumption of electricity for lighting. One option for reducing electricity consumption for lighting is to use daylight to illuminate occupied building spaces. These systems are termed "daylighting systems." The key to the widespread use of daylighting systems is the provision of such a system that is both inexpensive and easily applied to both new and existing buildings. In addition to the savings attributed to reduced electricity consumption, daylighting systems typically also result in increased productivity by the occupants of the illuminated space, reduced health problems evidenced by the occupants of the illuminated space and pollution reduction. This is because there appears to be a strong correlation between the quality of the luminous environment and the overall health and productivity of the occupants. These ancillary benefits can produce savings that dwarf the savings attributable to electricity consumption reduction, since studies indicate that, over the life of the building, approximately 97% of the operating cost of commercial space is the salaries of the occupants and any improvement in the performance of the occupants of the building space results in a significant economic benefit.

One such existing daylighting system is the traditional light shelf, which comprises an optical device which receives daylight that is transmitted through a window and redirects it onto the interior ceiling plane, thereby creating a useful source of interior illumination. The basic light shelf concept typically comprises a wide flat elongated interior light shelf located adjacent to a window and protruding into a room from the exterior wall of a building, and/or an exterior light shelf of similar construction projecting from the exterior wall of the building, coplanar with the interior light shelf to receive incident sunlight. The incident sunlight is reflected by the interior and/or exterior light shelves onto the ceiling of the occupied space by a diffuse or specular horizontal or slightly sloped surface of the light shelf, which light reflecting surface is located above a view glazing. However, the interior light shelf typically protrudes a significant distance into the occupied space and is problematic from architectural, mechanical and aesthetic standpoints in many room applications.

U.S. Pat. No. 5,285,315 discloses a system that uses light reflective elements that are sandwiched between two panes of glass to redirect sunlight into the interior space of a building. The reflective elements comprise both stationary and movable elements that function to redirect the incident sunlight to the back walls of the room, above eye level without striking the ceiling. The problem with this light reflecting system is that it is expensive to implement and produces illumination of variable quality. The existing glazing must also be replaced to implement this system, thereby rendering this system expensive and impractical to implement in existing buildings.

U.S. Pat. No. 4,557,565 discloses a system of refractive structures that are used to collect and redirect light into a building. The refractive structures comprise a planar solid transparent light deflecting panel or plate that is formed of a plurality of parallel identically spaced apart triangular ribs located on one face. With the panel in its vertical orientation and placed over a window opening, the panel substantially reflects external incident direct sunlight into the building interior. The panels are designed to require seasonal adjustments to compensate for the seasonal variations in the angle and nature of the incident sunlight. The refractive panels are expensive to implement and require periodic adjustment by the occupant to compensate for changes in the incident sunlight.

U.S. Pat. No. 5,293,305 discloses a light guidance system that illuminates the interior of a building by using a light deflection device equipped with a light source. The light guidance system is mounted in a window and both reflects sunlight coming from outside of the building as well as electric light coming from the light source. The light guidance system comprises several light reflective elements that are disposed parallel to one another and spaced apart from one another such that light from outside the building is reflected by the top surface of the light reflective elements and light from an internal light source is reflected by the bottom surface of the light reflective elements into the room. The light reflective elements function both to shade the interior from direct sunlight while also redirecting both the incident sunlight and the light from the light source into the room to provide indirect lighting. A problem with this light guidance system is that it relies on the close spatial-optical relationship between the electric lighting located at the window and the incident sunlight through the window. Another problem with this light guidance system is that it blocks the view through the window and relies on the placement of a source of electric light at the window. Thus, it is expensive to implement and requires expensive adaptation of existing installations to accommodate the light source.

U.S. Pat. No. 4,883,340 discloses a solar lighting apparatus that is mounted on the roof of a building to provide illumination of the interior of the building. The solar lighting apparatus comprises a reflector assembly that is rotatable about a vertical axis for tracking the daily movements of the sun. The reflector panel comprises multiple panels that are mounted on a frame over a skylight opening and the frame is rotated by the operation of solar tracking electronics. A problem with the solar lighting apparatus is that it is effective only for the room area located on the top floor of a multiple story building. In addition, it relies on electronics and mechanical tracking apparatus to collect and redirect the incident sunlight.

Thus, the field of interior space illumination systems is devoid of an inexpensive, practical, effective and simple to use daylighting system that can be easily implemented in both existing building applications as well as in new building construction.

SOLUTION

The above-described problems are solved and a technical advance achieved in the field by the present mini-optical light shelf daylighting system. The mini-optical light shelf is a daylighting system implemented in the paradigm of a window treatment that is applicable to both new installations as well as existing window glazing. In particular, the mini-optical light shelf is a passive, static optical device that is typically mounted juxtaposed to a window opening of a building. The mini-optical light shelf receives daylight transmitted through the window and efficiently redirects it onto the interior ceiling plane of a room (or other interior space) in a diffuse manner, thereby creating a useful source of interior illumination.

The mini-optical light shelf comprises multiple shelves, each of which contains an optically shaped top surface to allow light to be efficiently collected and accurately directed onto the ceiling plane of a room, while at the same time shading the occupants of the room from direct sunlight penetration through the shelves. The optical elements are narrow and can be implemented in the paradigm of a window treatment. The window area is partitioned into a view related glazing section and a daylight collection and redirection glazing area. The occupant's views out of the building remain relatively unobstructed through the view related area of the glazing to a height of approximately seven feet above the floor. Traditional window treatments can be used for this portion of the glazing for shading, privacy, and blackout control. The sunlight incident on the daylight collection area of the glazing is collected by the optical elements and redirected onto the ceiling plane of the room in a glare free manner.

The mini-optical light shelf system produces effective daylighting for typical ambient light levels for the perimeter zones of a building, and can operate for room depths in excess of 35 feet deep. The optical geometries of the light shelf elements and the associated reflective surface characteristics cooperatively diffuse the collected sunlight across the ceiling plane of the room. The resultant indirect lighting is striation free and substantially uniform in illuminance. The use of daylight preserves the visual and psychological connection between the occupants and the outdoors due to the subtle color and illuminance changes which occur throughout the day. Visual comfort is enhanced by evenly diffusing the daylight across the ceiling plane of the room from the perimeter wall to the interior extent of the illumination.

DETAILED DESCRIPTION

Glossary

The following definitions are provided to clarify the terminology used herein:

Room—The interior space of a building that can optionally be delimited by interior walls, floor, ceiling and, for the purpose of the examples used in the present description, is located juxtaposed to a window opening.

Building—A structure that serves to enclose a predefined set of interior space for use by occupants, which use includes residential, commercial, manufacturing, office, and the like without limitation.

Daylighting—The use of natural light from a clear sky (including daylight from both the solar disk and the sky dome) or overcast sky as an interior illuminant.

Daylighted Space—The space bounded by vertical planes rising from the boundaries of the daylighted area on the floor to the floor or ceiling above.

Daylight—As used herein, this term describes the natural light that is incident on a window glazing.

Theory of Operation of the Present Mini-Optical Light Shelf Daylighting System

Figure 5:
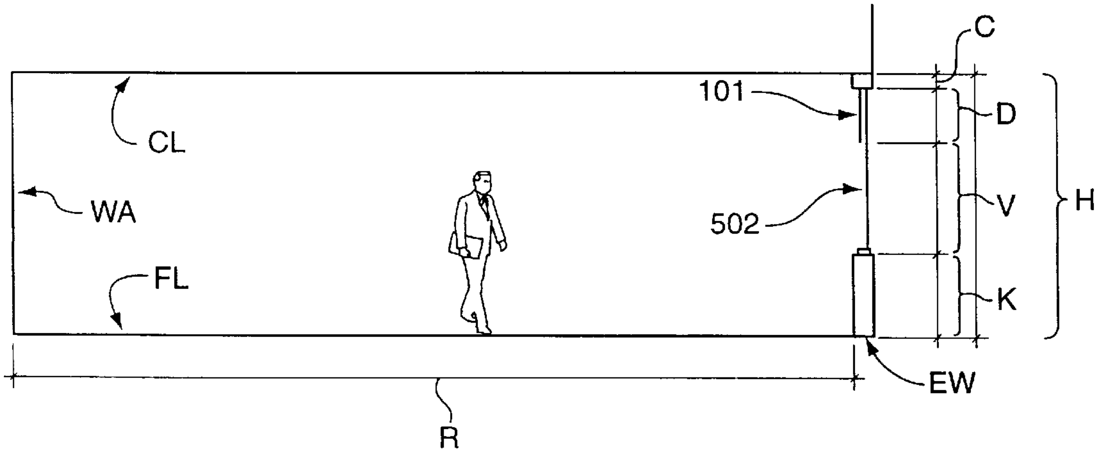
FIG. 5 illustrates a side cross-section view of a typical interior space in which the present mini-optical light shelf daylighting system is installed.

The typical interior space of a building in which the present mini-optical light shelf daylighting system 101 is used is illustrated in side cross-section view in FIG. 5. This particular interior space is selected to illustrate the capabilities of the mini-optical light shelf daylighting system 101 and is not intended to limit the applicability of the concepts disclosed herein. Many non-residential spaces are configured in a manner that is identical to or similar to the arrangement shown in FIG. 5 and this example serves to clearly illustrate the capabilities of the present mini-optical light shelf daylighting system 101. The space, termed "interior space" herein is shown as having an interior height H which is typically 9 feet 6 inches (approximately 3 meters) and a depth R that is typically 30 feet (approximately 10 meters) extending from the windows 502, which are located on the exterior wall EW, to an interior wall WA or other internal partition. The window configuration shown in FIG. 5 comprises a knee wall K of typical height of 3 feet (approximately 1 meter) in height, on top of which is installed a set of windows 502 which extend vertically typically another 6 feet (approximately 2 meters) and which are terminated at the top thereof by a small framing wall C, typically of height 6 inches (approximately ⅙ meter). The window glazing 502 is divided into two segments: view glazing V and daylighting glazing D. Within this interior space, the surfaces have typical light reflectance or light transmittance characteristics. Some typical values or ranges of values for light reflectance are: ceiling CL=0.8, wall WA=0.5, floor FL=0.2, vision glass=0.1 to 0.3 for a typical interior space. The light transmittance values for the window glass are up to 0.6 to 0.8 for typical window glass.

Figure 9:
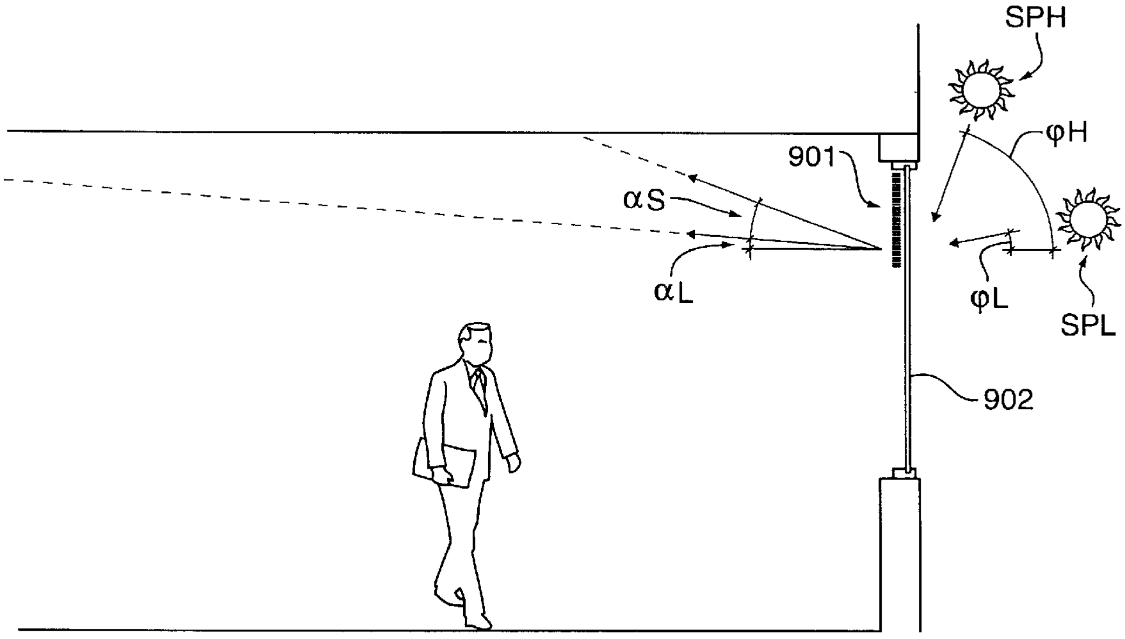
FIGS. 9–16 illustrate ray tracing diagrams to illustrate the concept of the mini-optical light shelf daylighting system.

The primary optical objective of the mini-optical light shelf daylighting system 901, as shown in FIG. 9, is to redirect the incident daylight that arrives through the window glazing 902 of the building from many directions external to the interior space of a room into a limited spread of light onto the ceiling of the interior space of the room. The sun typically changes position in the sky from a high location SPH at an angle of $\phi$H to a low sky position SPL at an angle of $\phi$L during the course of the day and year. The mini-optical light shelf daylighting system is a passive optical system which accomplishes this objective. Direct solar radiation arrives at the window plane 902 from a constantly changing direction as a function of both time of day and season of the year. Diffuse sky radiation arrives from all visible areas of the sky dome. A significant amount of this incident light is redirected by the mini-optical light shelf daylighting system 901 into a narrow beam of light onto the ceiling of the room, that ranges from a low angle of $\alpha$L to a high angle of $\alpha$S. Ideally, this narrow spread of light $\alpha$S-$\alpha$L changes minimally over the course of the sun's path across the sky from SPH to SPL. The ambient light level in the interior space should be on the order of 25 to 35 foot candles, and while this intensity may not satisfy the task lighting needs at the desk plane of an open interior space, with the desk plane being 30 inches (approximately 1 meter) above the floor level, it does provide sufficient ambient lighting in the interior space to obviate the need for much of the interior space electric lighting.

The basic architecture of the present mini-optical light shelf daylighting system 100 is illustrated in perspective view in the four embodiments shown in FIGS. 1–4. The optical elements used in the mini-optical light shelf daylighting system are designed to match the solar profile angle which is created by viewing the incoming daylight in a section that is cut perpendicular to the window pane and through the depth W of the mini-optical light shelf daylighting system 100. For the same solar position, the profile angle varies as a function of the window orientation. It is desirable to use as much diffuse daylight as possible for the interior lighting of the room and it is therefore desirable to implement the optical elements to be operational over a wide range of profile angles to work with all solar positions using a single optical element shape. As shown in FIG. 9, the typical range of solar elevation during the course of the year results in usable daylight having a profile angle in the range from $\phi$H to $\phi$L (approximately 10° to 70°), since daylight below 10° is typically blocked by surrounding structures or vegetation and daylight above 70° has high reflectance losses due to the window glazing.

The mini-optical light shelf daylighting system 100 employs multiple optical elements 115, each containing an optically shaped light shelf surface 105 that is optionally coated and optimally optically shaped to allow the incident light 111 to be collected and accurately redirected 112 onto the ceiling surface CL. The optical elements 115 of the mini-optical light shelf daylighting system 100 are of depth Wand construction to enable the mini-optical light shelf daylighting system 100 to be inexpensively manufactured and installed adjacent to the window 502 in the manner of mini-blinds. The mini-optical light shelf daylighting system 100 also includes a frame element 104A, 104B that comprises a support for the multiple optical elements 115. The frame is typically a fabric ladder assembly as used in conventional mini-blinds, although the frame can be any of a number of alternative configurations, such as a "picture frame" rigid support (not shown), located around the periphery of the optical elements. The frame can include a rigid header element 104C that serves as the support member that is attached to the header of the window opening, or can comprise some other mechanism for securing the mini-optical light shelf daylighting system 100 in place in the window opening. This architecture enables the mini-optical light shelf daylighting system 100 to be installed in existing interior spaces as well as new construction.

Figure 10:
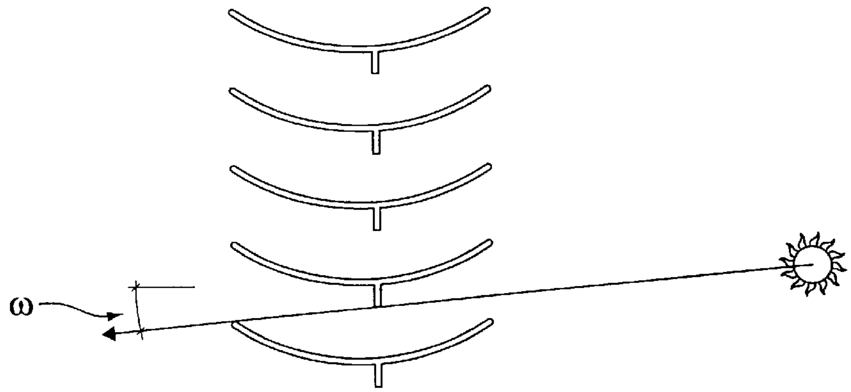
Figure 11:
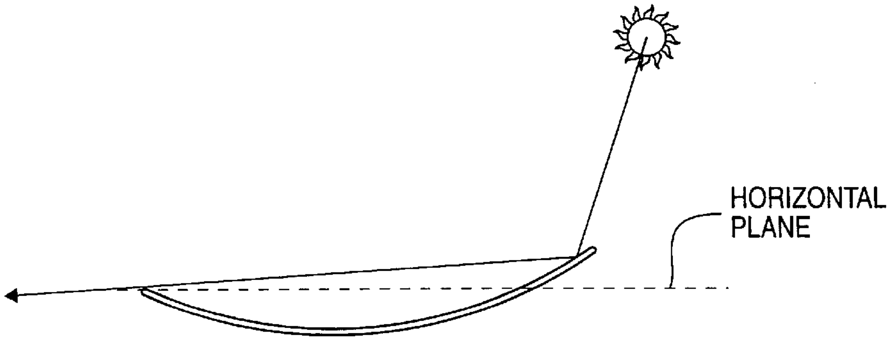

An additional objective of the mini-optical light shelf daylighting system 100 is to shade most of the low altitude sunlight to thereby prevent the incident sunlight 111 from creating direct glare as well as reflected glare on work surfaces that are located in the interior space. The shading of all direct sunlight is not necessary since a transitory period of direct sunlight, if kept to a minimum, is not objectionable. The mini-optical light shelf daylighting system 100 should preferably shade solar altitude angles that are above a predetermined angle $\omega$, such as between 5° and 10° as shown in FIG. 10, to thereby minimize this problem. Another objective of the mini-optical light shelf daylighting system 100 is to prevent any occupants of the interior space from having a direct view of the optical surfaces 105 of the optical elements 115. The optical surfaces 105, if viewed directly, present a source of glare that is objectionable to the occupants. Thus, for all locations within the interior space, the optical surfaces 105 of the optical elements 115 should remain out of direct view of the occupants. Thus, it is preferable to prevent light from projecting from the optical surfaces 105 below a horizontal plane, as shown in FIG. 11.

Prior Art Light Shelf Daylighting Systems

Figure 6:
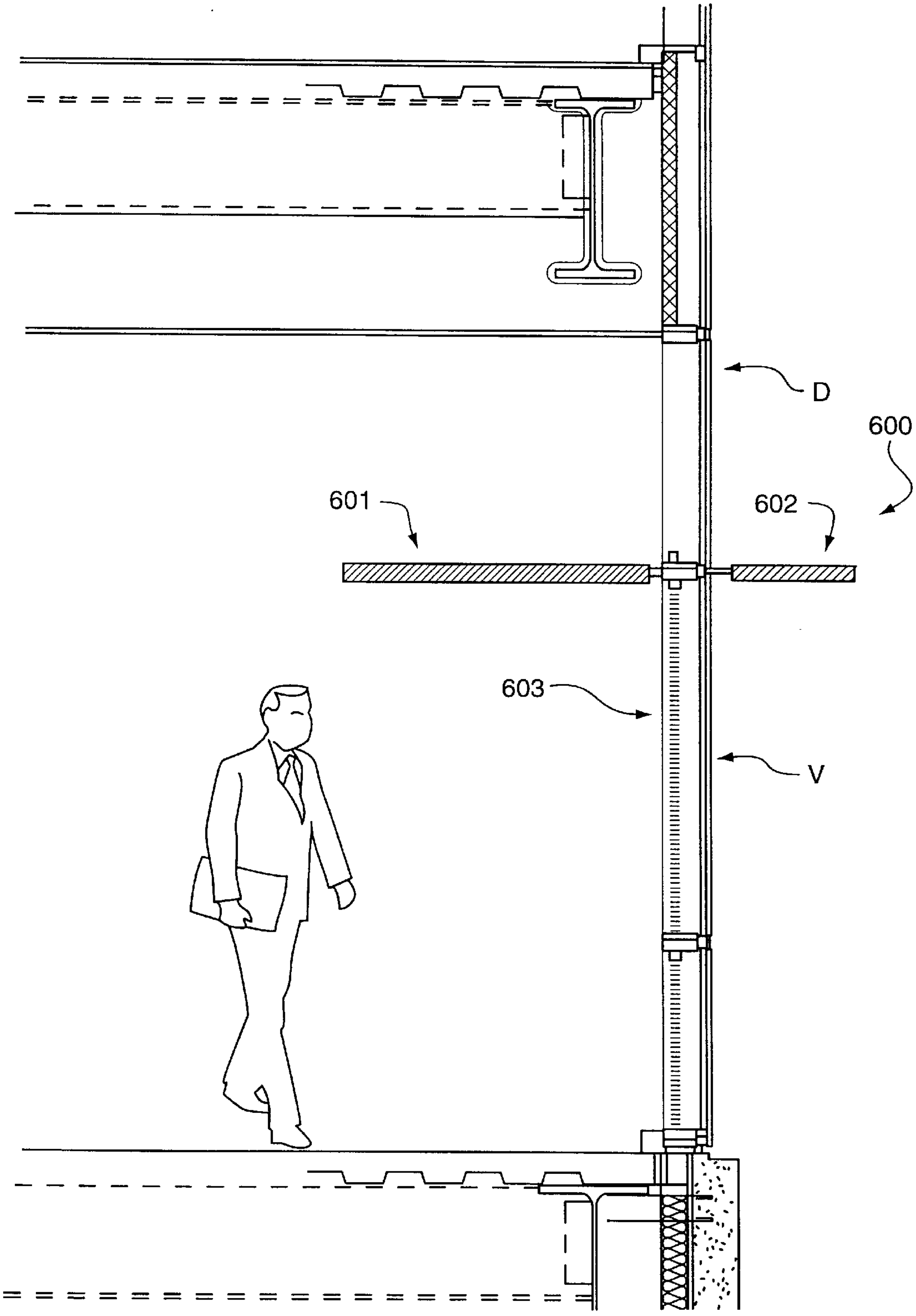
FIG. 6 PRIOR ART
FIG. 6 illustrates a side cross-section view of a typical prior art light shelf daylighting system.

FIG. 6 illustrates a side cross-section view of a typical prior art light shelf daylighting system. This prior art daylighting system 600 comprises at least one large custom optical light shelf 601 located in the interior space and/or a corresponding light shelf 602 located on the exterior of the building, which shelves 601,602 are oriented in a horizontal plane. The basic light shelf concept typically comprises a wide flat elongated interior light shelf 601 located adjacent to a window and protruding into a room from the exterior wall of a building, and/or an exterior light shelf 602 of similar construction projecting from the exterior wall of the building, coplanar with the interior light shelf 601 to receive incident sunlight. The incident sunlight is reflected by the interior 601 and/or exterior 602 light shelves onto the ceiling of the occupied space by a diffuse or specular horizontal or slightly sloped surface of the light shelf, which light reflecting surface is located above a view glazing V. However, the interior light shelf 601 protrudes a significant distance into the occupied space and is problematic from architectural, mechanical and aesthetic standpoints in many room applications. The window glazing area includes a view glazing area V which is equipped with a conventional shade control 603 to controllably regulate the intensity of the incident daylight that is transmitted to the interior space as well as to enable the occupants of the interior space to control the visibility of the interior space from outside the building. The upper portion of the window glazing is reserved for use as the daylighting glass area D wherein no apparatus is typically provided to block the incident daylight that arrives on the daylighting glass D, although a shade element may be provided for blackout purposes.

Mini Blind Mini-optical Light Shelf Daylighting System

Figure 1:
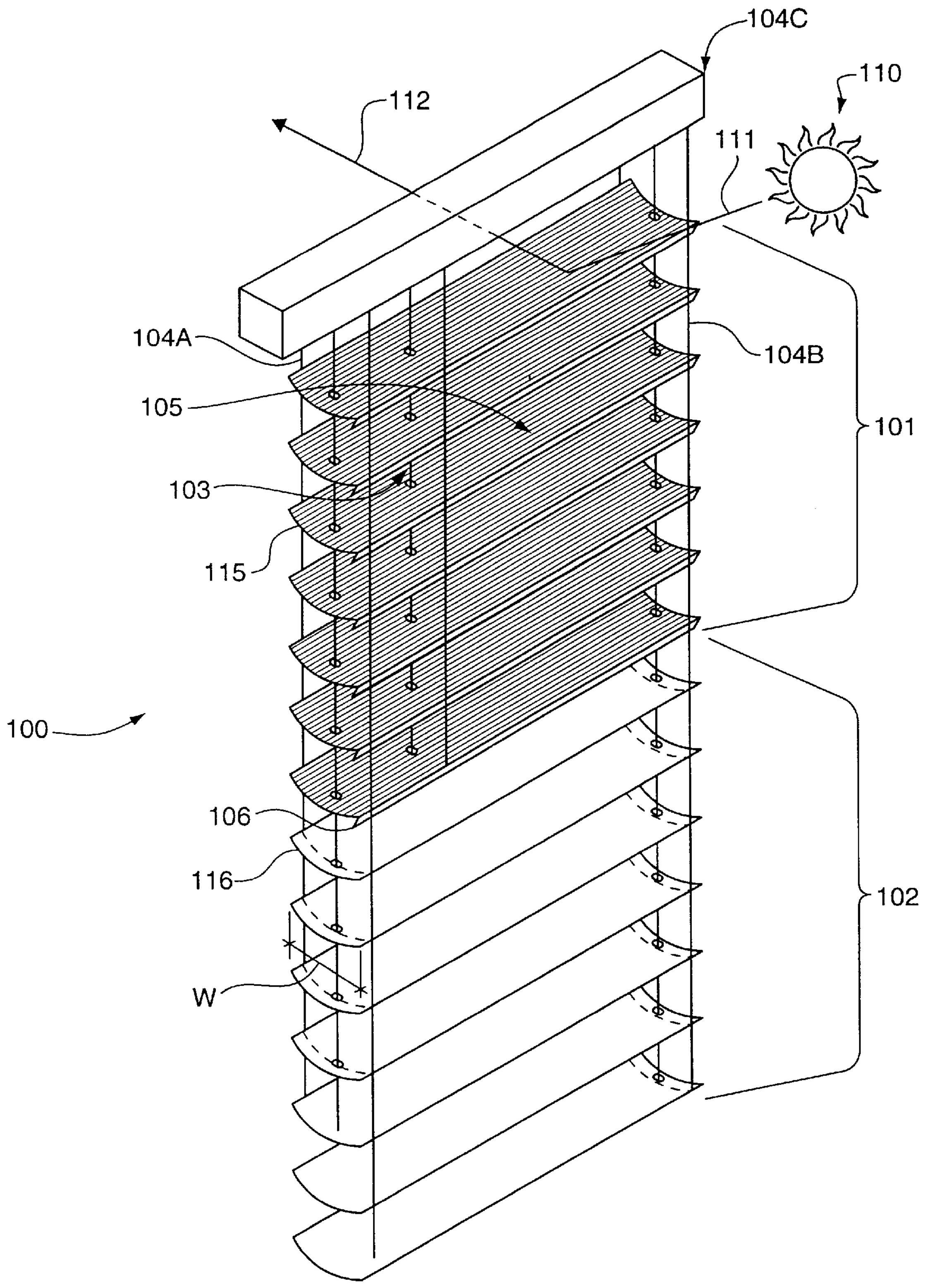
FIG. 1 illustrates a first preferred embodiment of the present mini-optical light shelf daylighting system.

FIG. 1 illustrates a first preferred embodiment of the present mini-optical light shelf daylighting system 100 that is shown conceptually in FIG. 5. The mini-optical light shelf daylighting system 100 is positioned adjacent to the window glazing 502 and located above the normal occupant viewing height. Thus, the typical installation of the mini-optical light shelf daylighting system 100 typically extends from seven feet (approximately 2⅓ meters) above the floor upward to the top of the window glazing 502. The window glazing 502 is partitioned into view related glazing V and daylighting glazing D. The occupant's views out of the building are unobstructed by the mini-optical light shelf daylighting system 100, since this system is located above the normal occupant viewing height. The mini-optical light shelf daylighting system 100 receives the unobstructed incident daylight that passes through the daylighting section D of the window glazing 502, collects this incident daylight and redirects it onto the ceiling surface CL in a glare free manner.

The mini-blind paradigm represents a practical solution to the need for daylighting since blind technologies have achieved almost total market acceptance from building owners, occupants, architects, and designers. The blind technology represents a mature and stable market and is easily integrated into new and existing non-residential and residential buildings. The mini-blinds are relatively inexpensive to manufacture and install. The major drawback of existing mini-blind technology is that the window blinds are used primarily for shade control and therefore reduce daylight utilization in the interior space. The mini-optical light shelf daylighting system 100 functions independent of the building's window glazing system and therefore can be used with any commercially available glazing product in both new construction and in a retrofit application. The mini-optical light shelf daylighting system 100 consists of a plurality of optical elements 115 that are arranged like slats of a mini-blind. The optical elements 115 are typically fabricated of extruded or stamped metal or plastic materials. The mini-optical light shelf daylighting system 100 is totally static and requires no adjustment of tilt throughout the day or during the year to account for variations in the position of the sun in the sky. The mini-optical light shelf daylighting system 100 provides direct solar shading of interior task surfaces, using the spacing between adjacent optical elements 115 and also by use of feature 106 as described below, while efficiently collecting, redirecting and diffusing daylight across the interior ceiling surface CL.

The mini-blind daylighting system 100 comprises an open, reflective, retractable louver in a form factor analogous to conventional mini-blinds. The optical elements 115 are inserted into, supported and controlled by a fabric ladder assembly as used in conventional mini-blinds. The optical elements 115 and the mini-blind elements 116, as shown in the figures, can be supported by and controlled by a single header 104C and fabric ladder system 104A, 104B, although the optical elements 115 and the mini-blind elements 116 can also each have their own dedicated header and fabric ladder system, in a "stacked" configuration (not shown). These configurations enable independent control of the optical elements 115 and the mini-blind elements 116. Thus, the mini-blind elements 116 located adjacent to the view glazing 502 can be closed or opened as desired by the occupants while the optical elements 115 remain deployed. The optical elements 115 can optionally be controllable in terms of providing a blackout capability where the optical elements 115 are rotated to block light transmission through the daylighting section D of the window glazing 502. In addition, both sections of the mini-optical light shelf daylighting system 100 can be retracted up against the headrail system to provide easy access to the window glazing 502 for cleaning or maintenance. The optical elements can be constructed using either an acrylic substrate or an aluminum substrate with an optical finish or high polish being placed on the top surface thereof. The optical elements 115 are of the same length and depth dimensions as the mini-blind elements 116 to facilitate complete retraction of the mini-blind elements 116. The bottom surface of the optical elements and all surfaces of the mini-blind elements can be colored to match interior decor.

Cellular Shade Mini-optical Light Shelf Daylighting System

Figure 2:
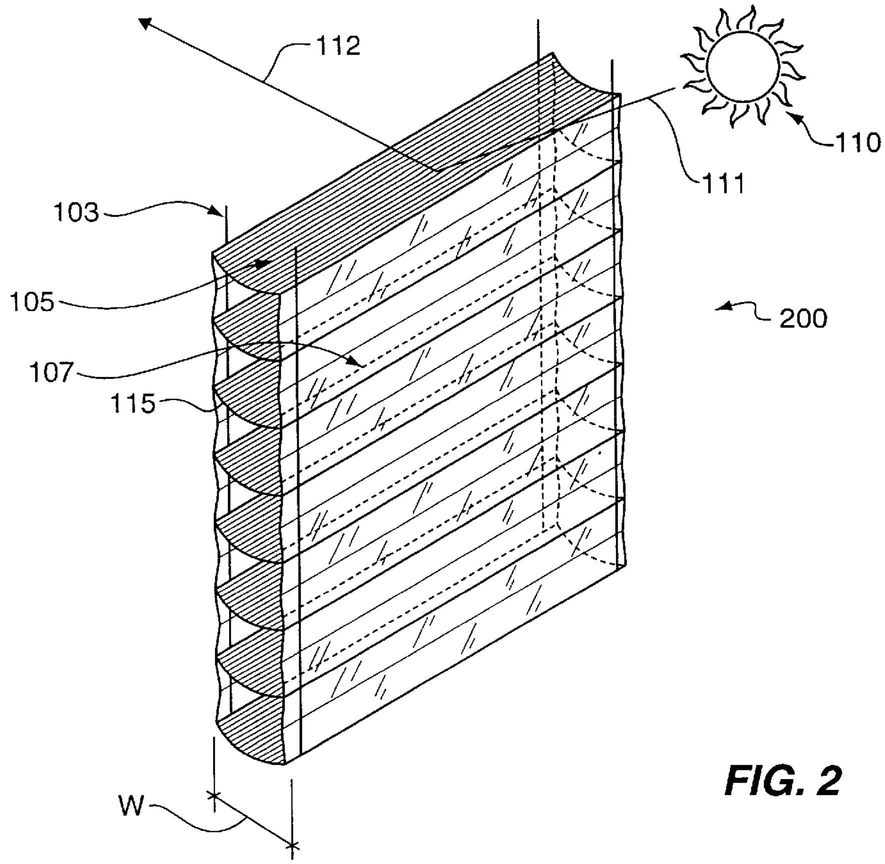
FIG. 2 illustrates a second preferred embodiment of the present mini-optical light shelf daylighting system.

FIG. 2 illustrates a second preferred embodiment 200 of the present mini-optical light shelf daylighting system. This embodiment 200 is based upon the pleated shade paradigm where a cellular shade 107 houses and supports the internally located louvers that comprise the optical elements 115 and the mini-blind elements (not shown). The cellular shade element 107 is constructed of an optically clear, flexible material, such as a fluoropolymer with the various cells that are formed in the pleated shade running horizontally. The blind structure is fabricated in a conventional manner using adhesive or heat welding techniques to bond the various panels of materials together. The bonded cellular shade 107 forms the support and suspension system for the optical elements 115 that are constructed using an acrylic substrate, an aluminum substrate, or other suitable material with an optical finish or high polish being placed on the top surface 105 thereof. The optical elements 115 are inserted into the horizontal cells of the cellular shade 107. The headrail supports both the optical elements 115 and window shading portions comprising the mini-blind elements 116 (not shown in FIG. 2) with the view-shading portion of the mini-optical light shelf daylighting system 200 being heat welded to the bottom of the daylighting blind element section 101. Thus, the daylighting 101 and view shading 102 sections of the mini-optical light shelf daylighting system 200 comprise a single unified blind system. The cellular shade element 107 can be fabricated of low emissivity (low-E) materials or have a low-E coating applied thereto to improve thermal characteristics of the mini-optical light shelf daylighting system 200.

Refractive Mini-Optical Light Shelf Daylighting System

Figure 3:
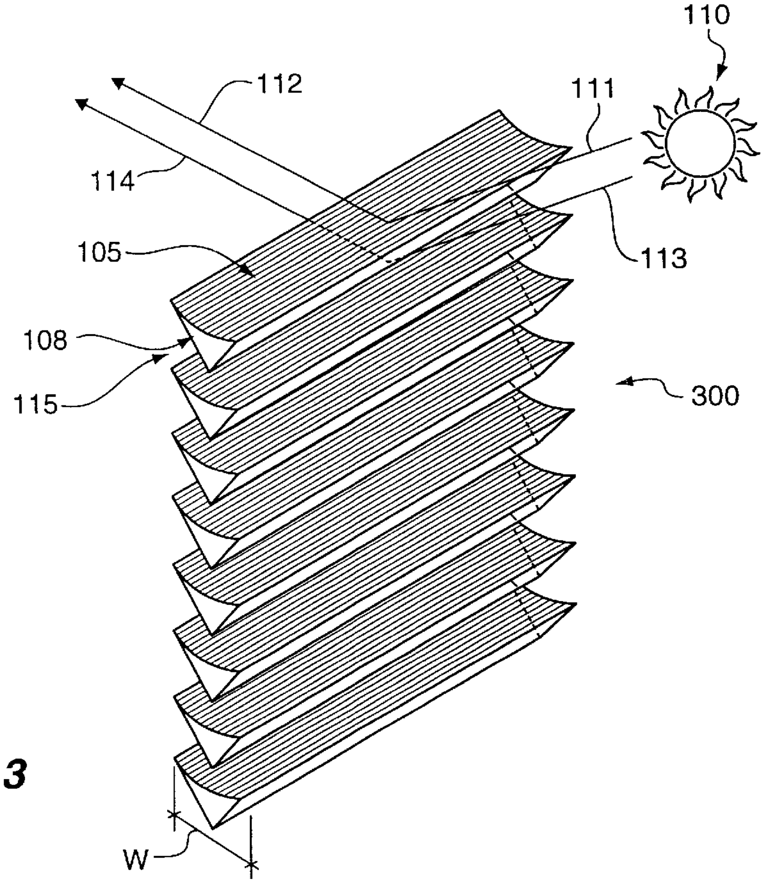
FIG. 3 illustrates a third preferred embodiment of the present mini-optical light shelf daylighting system.

FIG. 3 illustrates a third preferred embodiment 300 of the present mini-optical light shelf daylighting system. This embodiment 300 of the mini-optical light shelf daylighting system comprises a plurality of fixed optical elements 115 that are mounted adjacent to the daylighting window glazing 502, using for example a fixed mini-blind like support structure (not shown). The optical elements comprise a body 108 that uses both reflection 112 from optical surface 105 and refraction 114 through body 108 to collect and redirect the incident daylight onto the interior ceiling surface CL.

Panel Mini-Optical Light Shelf Daylighting System

Figure 4:
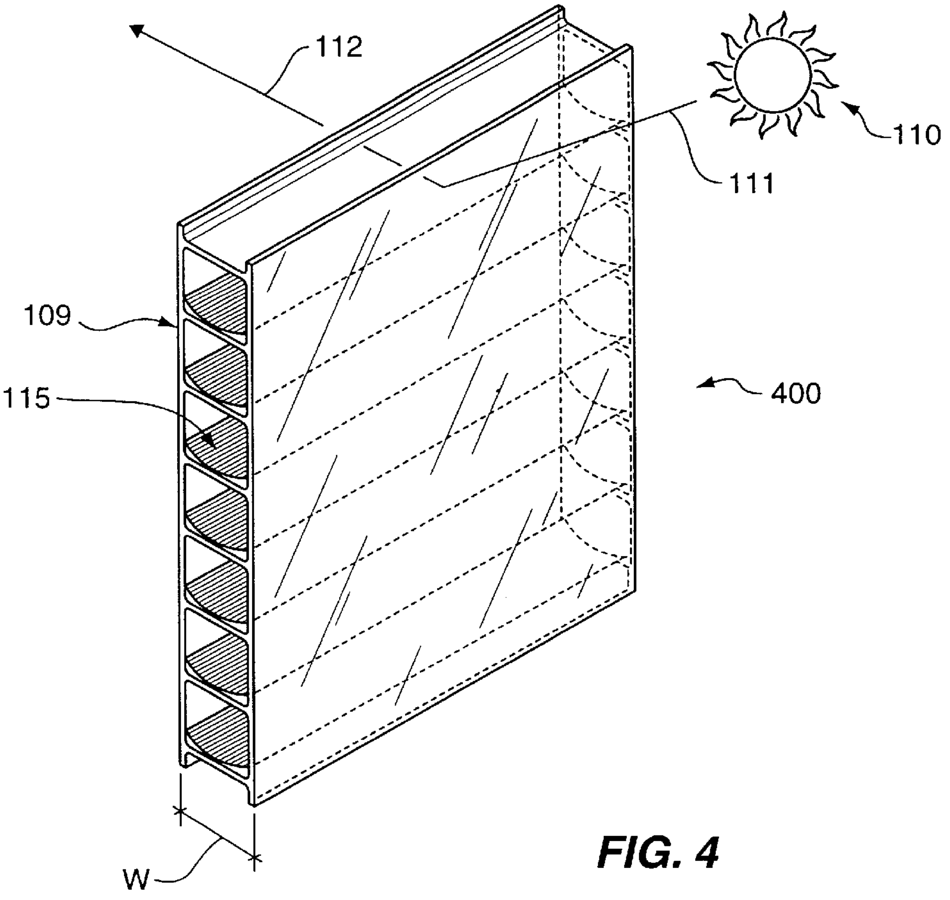
FIG. 4 illustrates a fourth preferred embodiment of the present mini-optical light shelf daylighting system.

FIG. 4 illustrates a fourth preferred embodiment 400 of the present mini-optical light shelf daylighting system. This embodiment 400 of the mini-optical light shelf daylighting system comprises a plurality of fried optical elements 115 that are mounted in rigid transparent cellular sheets 109 as the support elements. The transparent cellular sheets 109 function as an independent glazing element and can be fabricated of an acrylic-based insulating glazing material. The daylighting system is fabricated by forming the rigid cells, then inserting the optical elements therein. The resultant daylighting module is then finished into the form of a sealed window glazing element.

Optical Characteristics of Mini-Optical Light Shelf Daylighting System

Figure 7:
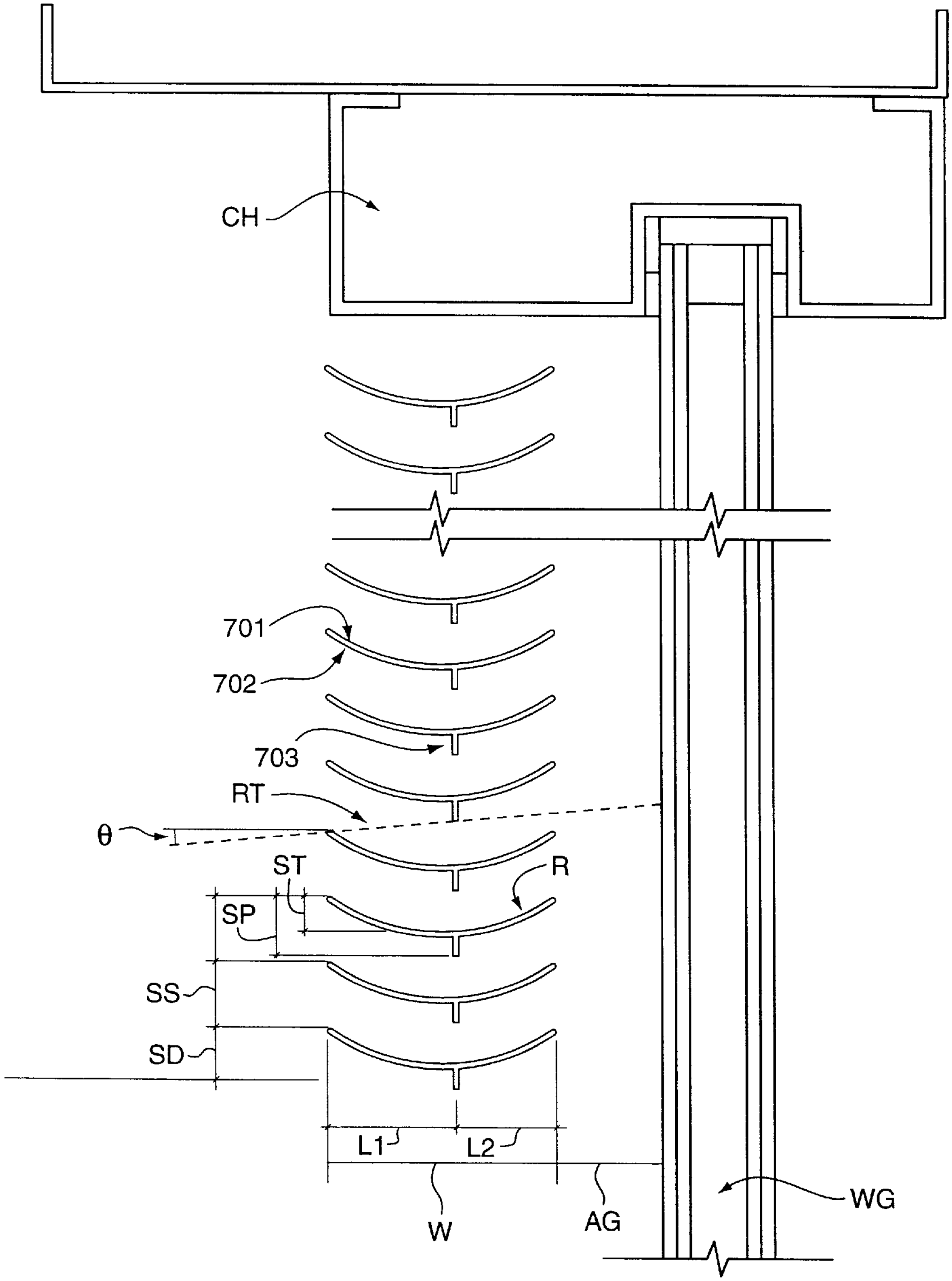
FIGS. 7–8 illustrate side cross-section views of two embodiments of the light reflective elements of the present mini-optical light shelf daylighting system.
Figure 8:
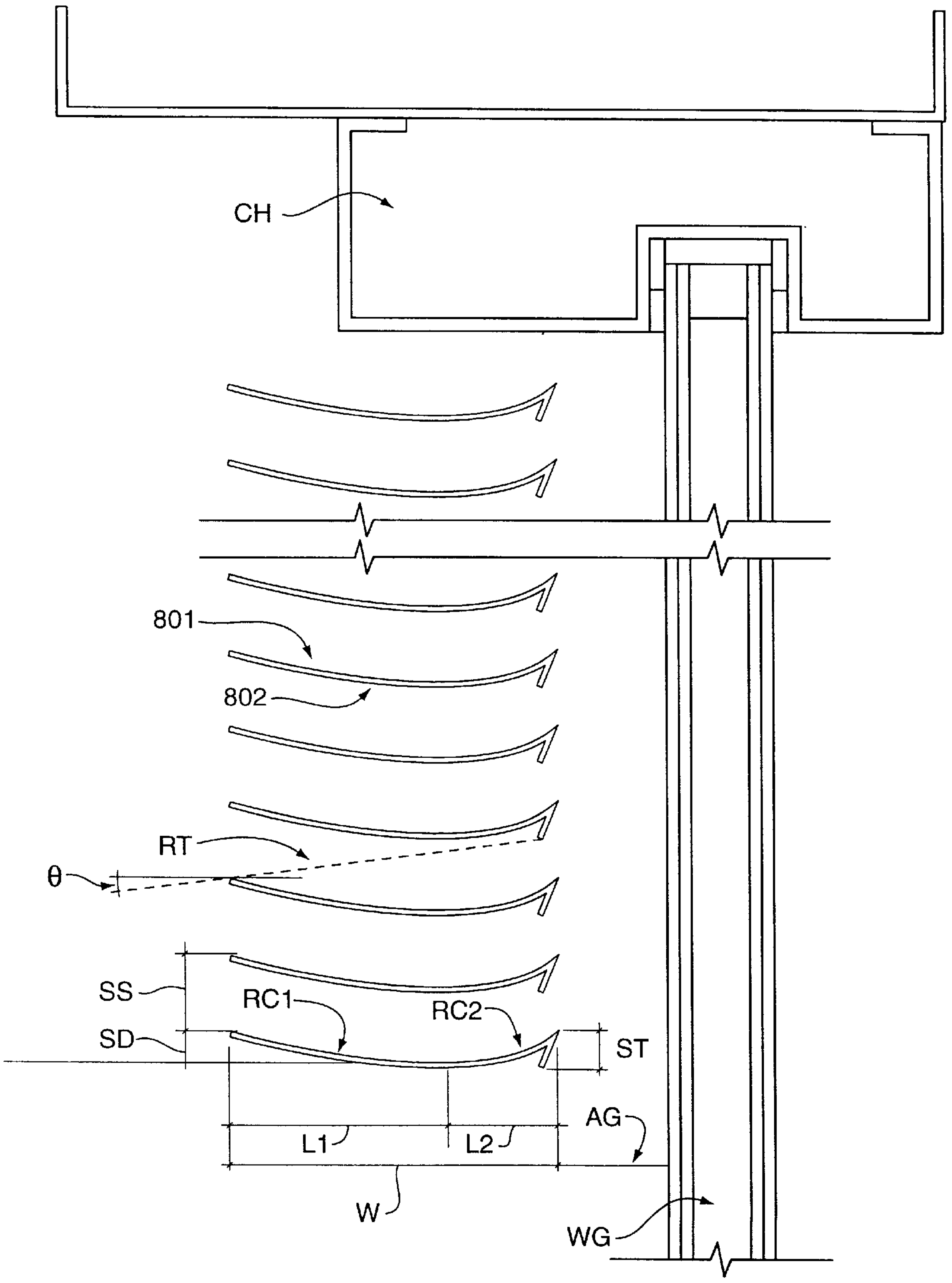

The optical characteristics of the mini-optical light shelf daylighting system can be understood by referencing FIGS. 7–8 which illustrate side cross-section views of two embodiments of the light reflective elements 115 of the present mini-optical light shelf daylighting system and FIGS. 9–21 which illustrate ray tracing diagrams to illustrate the concept of the mini-optical light shelf daylighting system. For the purpose of illustrating the operation of the mini-optical light shelf daylighting system concept, the embodiment of FIG. 1 is used as the operational example. Thus, the cross-section views of FIGS. 7 and 8 represent two geometries of the optical elements 115 that can be used to fabricate the mini-optical light shelf daylighting system 100 and provide the optical characteristics noted above.

Figure 12:
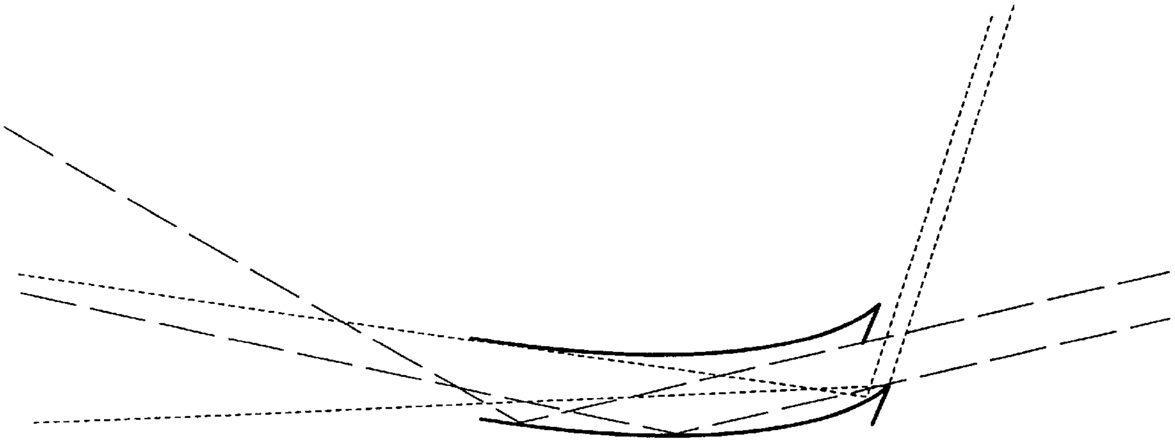

The optical surface 105 of the optical elements 115 uses a different portion of the optical surface for different profile angles, as shown in FIG. 12. High profile angles use the forward end of the optical surface 105 while low profile angles use the back portion of the optical surface 105. Thus, for a particular profile angle, only a limited portion of the optical surface 105 is used to reflect the incident daylight. As the profile angles vary, the incident daylight strikes a portion of the optical surface 105 that presents reflection characteristic that maintains the reflected light in a predetermined desired range of reflected angles to illuminate the interior ceiling surface CL. Thus, the cross-section illustrated in FIG. 12 has a leading edge that has a tighter radius than the trailing edge. The larger profile angles hit only a small portion of the leading edge so this incident daylight requires a steeper reflecting angle and must also be spread out to illuminate a wide area, thereby requiring a small radius smooth curve reflecting optical surface 105. The lower profile angle incident daylight is incident on a larger portion of the optical surface 105 and therefore requires a flatter, larger radius curvature to spread out to illuminate a wide area. Reflected light that is incident on the bottom side 702 of the optical elements 105 is not useful and can cause glare to the occupant and such reflections should be kept to a minimum.

The projected light should have a smooth gradient over the entirety of the ceiling surface CL. Each column of incident daylight requires a slight spread that varies as profile angle, and the profile angles vary over time, the optical surface 105 should have a smooth continuous surface. The spacing between adjacent optical elements 115 can be used to regulate the shading performed by the mini-optical light shelf daylighting system 100. One element of the design of the mini-optical light shelf daylighting system 100 is that the optical elements 115 project light into the interior space at a shallow angle, so the location of the optical surface 105 must allow it to project its light at a shallow angle over the trailing edge of the optical element 115, which trailing edge performs the dual functions of shading the interior space from direct sunlight and to block the optical surface 105 from direct view of the occupants. These design criteria implies that the optical surface 105 must have a large aspect ratio in the form of a shallow slat design.

Figure 13:
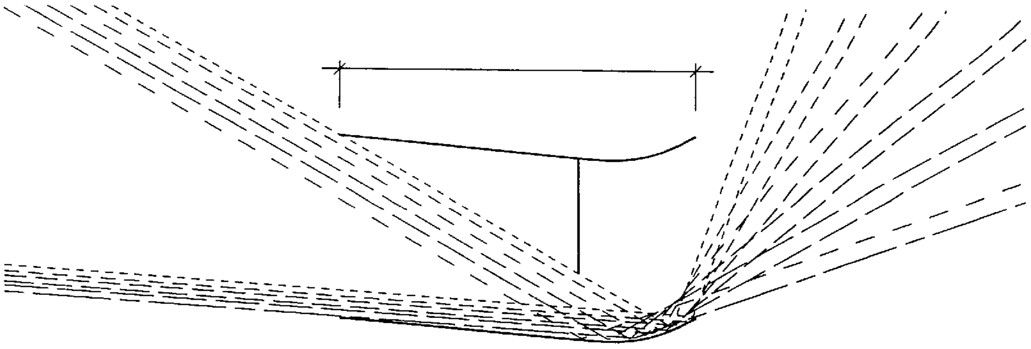
Figure 14:
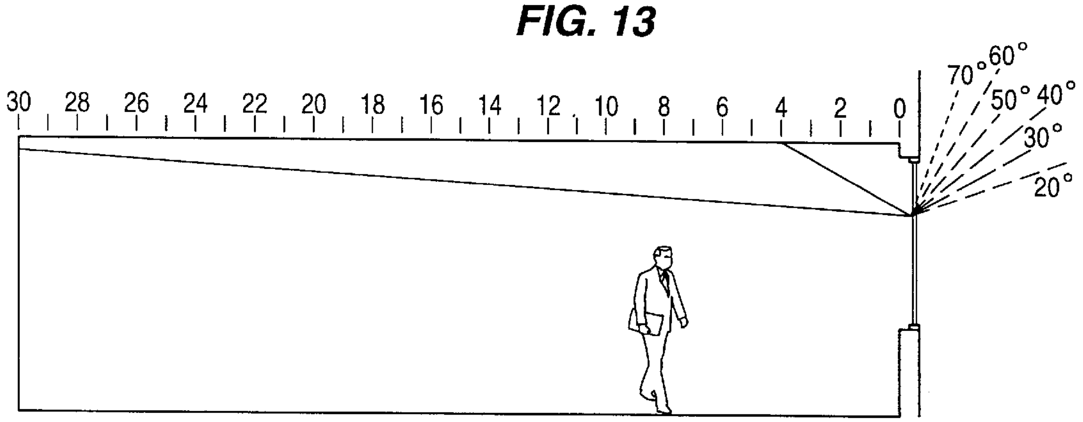
Figure 15:
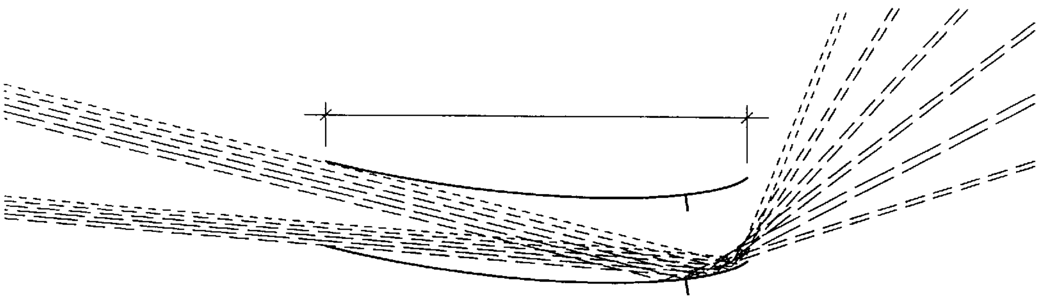
Figure 16:
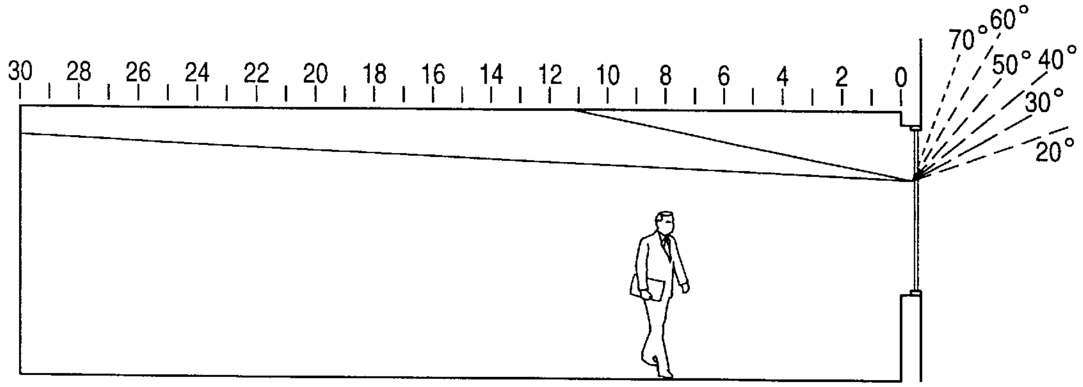

FIGS. 7–8 illustrate side cross-section views of two embodiments of the light reflective elements 115 of the present mini-optical light shelf daylighting system 100. The cross-section shape of FIG. 7 comprises a simple arc with a radius R typically of dimension 1.8 inches. The incident daylight is reflected from the optical surface 105 onto the ceiling surface CL in a single bounce and the incident daylight is projected further into the interior space for higher profile angles. The optical elements 115 include a baffle 703 formed on the bottom side 702 thereof to shade the interior space from direct sunlight at very low profile angles. The cross-section shape of FIG. 8 provides a flatter reflective surface than the architecture of FIG. 7 while also maintaining a tighter radius at the forward edge. The ray tracing diagrams of FIGS. 13–16 illustrate two examples of how both the shape of the optical elements and the spacing between adjacent optical elements influences the light reflection. In FIGS. 15 and 16, the width of the optical element is 2 inches and the spacing between adjacent optical elements is 0.4 inches. This design provides a narrow target light spread due to the limited aperture provided at the trailing edge of the optical elements. The light spread is 3° to 12° and this configuration results in a light shelf of relatively low efficiency since the projected light does not illuminate a significant portion of the ceiling surface from the window into the interior space but provides more even ceiling illumination when a plurality of optical elements are provided. In contrast, the configuration of FIGS. 13 and 14 provides a light spread of 4° to 30°, which results in a relatively higher illumination efficiency but creates more uneven illumination when a plurality of optical elements are provided. The redirected light illuminates the ceiling surface from a location proximate to the window glazing to the full depth of the interior space. It is obvious that by varying the spacing between the adjacent optical elements as well as their curvature, the spread of illumination and the intensity of the illumination can be controlled. This enables the basic design to be adapted for different depth interior spaces and for window glazing of different heights.

Optical Surface Coatings

The surfacing applied to the substrate comprises either totally specular polished finished surfaces or applied materials (such as SA-85 specular aluminized film manufactured by 3M) and thin film Fresnel lens material (such as DL-2000 daylighting film manufactured by 3M). These surface finishes and applied materials are selected to efficiently redirect the incident sunlight onto the interior ceiling surface without creating harsh reflected images or brightness patterns with high contrast ratios. The above-noted applied materials can be laminated to either the acrylic or aluminum substrates mini-optical light shelf daylighting system and provide high reflectance ratios. The thin film Fresnel lens material uses minute Fresnel lens grooves formed in an optically clear acrylic thin film to which is applied an aluminized backing. The Fresnel lens grooves consist of minute constant radius convex facets with an angle of 3.5° at the cusp. This architecture and the index of refraction of the acrylic material results in a Fresnel system with constant radius facets that have an apparent angle of 5° at the cusp. The Fresnel grooves allow the light to be precisely diffused 10° about the primary reflected ray for most moderate incident angles. This diffusion increases to 15° for high incident angles, such as angles above 50°. The diffusion characteristics of the Fresnel film reduces the harsh solar images that are normally created by standard specular films, thereby minimizing high illuminance and luminance ratios across the illuminated surface. This precise diffusion also results in a significant improvement over the optical performance of a specular film with a slight matte texture, which results in a more highly diffuse reflected component.

Azimuthal Correction

Figure 17:
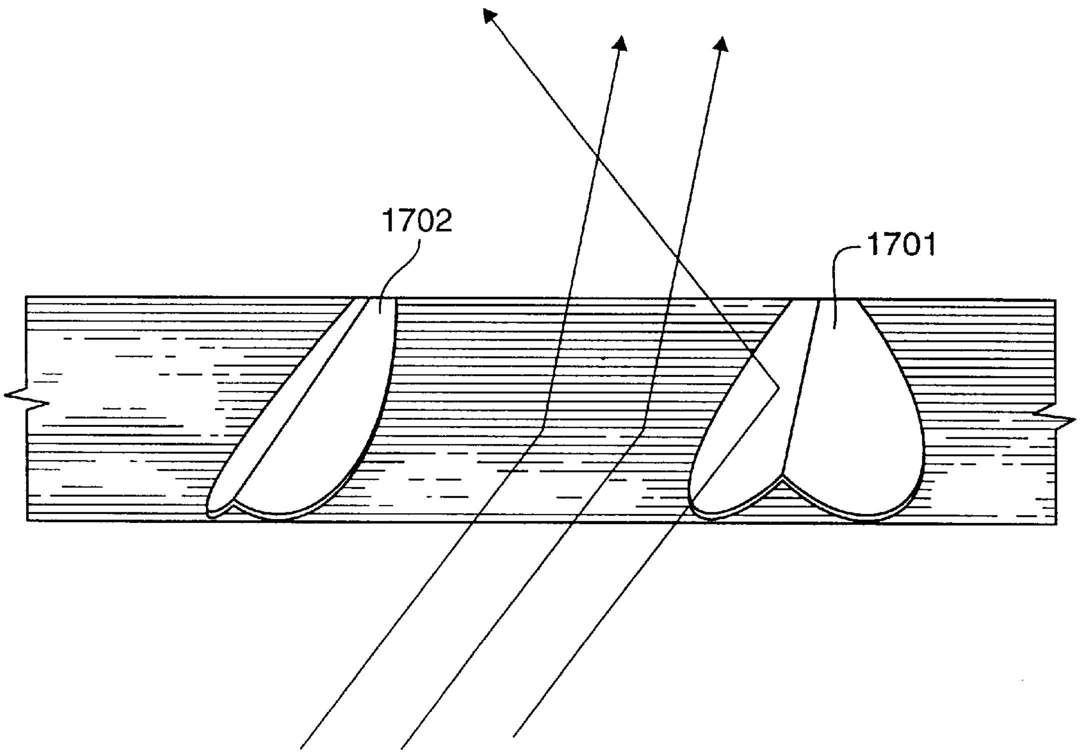
FIG. 17 illustrates an azimuthal correction element that can be used in the present mini-optical light shelf daylighting system to provide additional control over the light distribution.

FIG. 17 illustrates an azimuthal correction element that can be used in the present mini-optical light shelf daylighting system to provide additional control over the light distribution. In particular, the above description illustrates the operation of the optical elements 115 which allow light to be efficiently collected and accurately directed in a vertical direction onto the ceiling plane of a room. However, the description does not address the horizontal redirection of the incident daylight. The orientation of the window glazing with respect to the sunlight may be on a horizontal acute angle, such that the incident sunlight is not perpendicular to the window glazing. Thus, it is desirable for the optical elements 115 to be capable of providing not only vertical redirection of the incident light, but also horizontal redirection of the incident light to ensure the uniformity of daylighting within the room. The azimuthal correction elements 1701, 1702 shown in FIG. 17 represent physical elements that can be added to the optical elements 115 to implement this capability. The azimuthal correction can be effected by either physical structures that are added to the optical elements 115 or optical characteristics formed in the reflective surface of the optical elements 115, such as a striation that is integral to reflective surface, typically formed by means of grinding into the reflective surface and/or polishing the reflective surface. The azimuthal correction features function to horizontally redirect the incident sunlight to substantially emulate the case where the incident sunlight is preendicular to the window glazing. Thus, the azimuthal correction features provide a horizontal redirection component to the incident sunlight as indicated by the ray tracing lines on FIG. 17.

Additional Variations

The above described mini-optical light shelf system can be adapted for any of a multitude of uses and environments. For example, while the above description notes that the window glazing is partitioned into a view related glazing section and a daylight collection and redirection glazing area which is located adjacent to and above the view related glazing section. However, the window glazing can be partitioned in any other desired configuration, such as having an additional glazing area located below the view related glazing section (floor length windows) and/or above the daylight collection and redirection glazing area. The partitioning of the window glazing into the various sections can be virtual in that the window glazing lacks a physical division between the adjacent sections, or the various sections can be physically delimited by frame elements or wall sections. The mini-optical light shelf system has been shown installed juxtaposed to the window glazing, but the separation between the mini-optical light shelf system and the window glazing is not critical, with the efficiency of the mini-optical light shelf system being determined in part by this separation. Thus, the mini-optical light shelf system is operable even if it is not mounted against the window glazing. The control elements that are used to operate the traditional window treatment segment of the mini-optical light shelf system are well known in this field and have not been disclosed in detail herein, since the implementation of these elements involves simple engineering choice.

SUMMARY

The mini-optical light shelf comprises multiple shelves, each of which contains an optically shaped top surface to allow light to be efficiently collected and accurately directed onto the ceiling plane while at the same time shading the occupants from direct sunlight penetration through the shelves. The optical elements are narrow and can be implemented in the paradigm of a window treatment. The window area is partitioned into a view related glazing section and a daylight collection and redirection glazing area. The occupant's views out of the building remain relatively unobstructed through the view related area of the glazing to a height of approximately seven feet. Traditional window treatments can be used for this portion of the glazing for shading, privacy, and blackout control. The sunlight incident on the daylight collection area of the glazing is collected and redirected onto the ceiling plane in a glare free manner.

What is claimed:

1. A daylighting apparatus, mountable adjacent to a window opening located on a wall of a room, for redirecting incident sunlight into said room to illuminate said room, comprising:

frame means for mounting said daylighting apparatus juxtaposed said window opening, where said window opening presents an occupant of said room with a field of view to look through said window opening; and a plurality of identical light reflecting element means, mounted in said frame means in a fixed position, that is a substantially parallel, spaced apart orientation, for redirecting said incident sunlight into said room, each of said light reflecting element means comprising:

an elongated substantially linear member having a top surface and a bottom surface, said top surface being of a geometry to redirect said incident sunlight received from a predetermined range of directions onto a predetermined region of a ceiling surface of said room absent said redirected incident sunlight being transmitted into said field of view, while concurrently blocking low altitude direct sunlight from entering said room.

2. The daylighting apparatus of claim 1 wherein each of said light reflecting element means further comprises:

reflective coating means applied to said top surface for reflecting said incident sunlight.

3. The daylighting apparatus of claim 2 wherein said reflective coating means comprises:

optical film means for diffusing said incident sunlight.

4. The daylighting apparatus of claim 3 wherein said optical film means comprises:

a plurality of Fresnel lens grooves formed in said optical film means.

5. The daylighting apparatus of claim 3 wherein said optical film means comprises:

a specular coating deposited on said top surface.

6. The daylighting apparatus of claim 2 wherein said reflective coating means comprises:

a clear acrylic film; and a plurality of features formed on a back side of said clear acrylic film, said features comprising constant radius convex facets.

7. The daylighting apparatus of claim 6 wherein said facets have an angle of 3.5 degrees at a cusp of said constant radius convex facets.

8. The daylighting apparatus of claim 1 wherein said top surface of said elongated substantially linear member comprises:

a smooth reflective surface, responsive to receipt of incident sunlight at profile angles between 10 and 70 degrees for projecting said received incident sunlight up to 20 degrees above a horizontal plane.

9. The daylighting apparatus of claim 1 wherein said top surface of said elongated substantially linear member comprises:

a curvilineal surface of varying curvature radius, wherein different portions of said top surface receive said incident sunlight for different angles of said incident sunlight.

10. The daylighting apparatus of claim 9 wherein said curvilineal surface has a leading edge with a tighter radius than a trailing edge of said complex curvilinear surface.

11. The daylighting apparatus of claim 1 wherein said means for blocking comprises:

a substantially vertically oriented member projecting from said bottom surface for blocking low altitude direct sunlight from entering said room.

12. The daylighting apparatus of claim 1 wherein said frame means comprises:

fabric ladder assembly means for supporting said plurality of light reflecting element means in a substantially parallel oriented, spaced apart orientation.

13. The daylighting apparatus of claim 1 wherein said frame means comprises:

cellular shade means having formed therein a plurality of pockets in a substantially parallel oriented, spaced apart orientation, each of said pockets for supporting a corresponding one of said plurality of light reflecting element means.

14. The daylighting apparatus of claim 1 wherein said frame means comprises:

rigid transparent cellular sheet means having formed therein a plurality of pockets in a substantially parallel oriented, spaced apart orientation, each of said pockets for supporting a corresponding one of said plurality of light reflecting element means.

15. The daylighting apparatus of claim 1 further comprising:

a plurality of light blocking element means, mounted in said frame means in a substantially parallel oriented, spaced apart orientation, for controllably blocking said incident sunlight from entering said room.

16. The daylighting apparatus of claim 15 wherein said plurality of light reflecting element means are mounted in said frame means located above said plurality of light blocking element means that are mounted in said frame means.

17. The daylighting apparatus of claim 15 wherein said frame means comprises:

means for controllably regulating a position of said plurality of light blocking element means to regulate a quantity of light entering said room through said daylighting apparatus.

18. The daylighting apparatus of claim 1 wherein each of said light reflecting element means further comprises:

azimuthal correction means formed on said top surface to redirect said incident sunlight received from a predetermined range of horizontal and vertical directions onto a predetermined region of a ceiling surface of said room.

19. The daylighting apparatus of claim 18 wherein said azimuthal correction means comprises:

a plurality of members projecting from said top surface and being of a geometry to redirect said incident sunlight received from a predetermined range of horizontal and vertical directions onto a predetermined region of a ceiling surface of said room.

20. The daylighting apparatus of claim 18 wherein said azimuthal correction means comprises:

features formed in said top surface and functioning to redirect said incident sunlight received from a predetermined range of horizontal and vertical directions onto a predetermined region of a ceiling surface of said room.

21. A daylighting apparatus, mountable adjacent to a window opening located on a wall of a room, for redirecting incident sunlight into said room to illuminate said room, comprising:

frame means for positioning and supporting said daylighting apparatus adjacent said window opening, where said window opening presents an occupant of said room with a field of view to look through said window opening; and a plurality of identical substantially parallel oriented, spaced apart light reflecting element means, mounted in said frame means in a fixed relationship to said frame means, for redirecting said incident sunlight into said room absent said redirected incident sunlight being transmitted into said field of view, comprising:

an elongated substantially linear member having a top surface for redirecting said incident sunlight on to a ceiling plane of said room, said top surface being oriented to provide an occupant of said room with no direct view of said top surface, when said occupant is within said room with said occupant's eye level being up to seven feet above a floor of said room, and a plurality of light blocking element means for controllably blocking low altitude components of said incident sunlight from entering said room concurrent with said elongated substantially linear member redirecting said incident sunlight on to said ceiling of said room.

22. The daylighting apparatus of claim 21 wherein said top surface of each of said light reflecting element means being of a geometry to project received incident sunlight up to 20 degrees above a horizontal plane in response to receipt of incident sunlight at profile angles between 10 and 70 degrees.

23. The daylighting apparatus of claim 21 wherein each of said light reflecting element means further comprises:

reflective coating means applied to said top surface for reflecting said incident sunlight.

24. The daylighting apparatus of claim 23 wherein said reflective coating means comprises:

optical film means for diffusing said incident sunlight.

25. The daylighting apparatus of claim 24 wherein said optical film means comprises:

a plurality of Fresnel lens grooves formed in said optical film means.

26. The daylighting apparatus of claim 24 wherein said optical film means comprises:

a specular coating deposited on said top surface.

27. The daylighting apparatus of claim 23 wherein said reflective coating means comprises:

a clear acrylic film; and a plurality of features formed on a back side of said clear acrylic film, said features comprising constant radius convex facets.

28. The daylighting apparatus of claim 27 wherein said facets have an angle of 3.5 degrees at a cusp of said constant radius convex facets.

29. The daylighting apparatus of claim 21 wherein said top surface of said elongated substantially linear member comprises:

a smooth reflective surface, responsive to receipt of incident sunlight at profile angles between 10 and 70 degrees for projecting said received incident sunlight up to 20 degrees above a horizontal plane.

30. The daylighting apparatus of claim 21 wherein said top surface of said elongated substantially linear member comprises:

a curvilinear surface of varying curvature radius, wherein different portions of said top surface receive said incident sunlight for different angles of said incident sunlight.

31. The daylighting apparatus of claim 30 wherein said complex curvilinear surface has a leading edge with a tighter radius than a trailing edge of said curvilinear surface.

32. The daylighting apparatus of claim 21 wherein said means for blocking comprises:

a substantially vertically oriented member projecting from said bottom surface for blocking low altitude direct sunlight from entering said room.

33. The daylighting apparatus of claim 21 wherein said frame means comprises:

fabric ladder assembly means for supporting said plurality of light reflecting element means and said light blocking element means in a substantially parallel oriented, spaced apart orientation.

34. The daylighting apparatus of claim 21 wherein said frame means comprises:

cellular shade means having formed therein a plurality of pockets in a substantially parallel oriented, spaced apart orientation, each of said pockets for supporting a corresponding one of said plurality of light reflecting element means and said light blocking element means.

35. The daylighting apparatus of claim 21 wherein said frame means comprises:

rigid transparent cellular sheet means having formed therein a plurality of pockets in a substantially parallel oriented, spaced apart orientation, each of said pockets for supporting a corresponding one of said plurality of light reflecting element means and said light blocking element means.

36. The daylighting apparatus of claim 21 wherein said plurality of light reflecting element means are mounted in said frame means located above said plurality of light blocking element means that are mounted in said frame means.

37. The daylighting apparatus of claim 21 wherein said frame means comprises:

means for controllably regulating a position of said plurality of light blocking element means to regulate a quantity of light entering said room through said daylighting apparatus.

38. The daylighting apparatus of claim 37 wherein said means for controllably regulating is operable to regulate a position of said plurality of light blocking element means absent simultaneously operating said plurality of light reflecting element means.

39. The daylighting apparatus of claim 21 wherein said frame means comprises:

means for controllably regulating a position of said plurality of light reflecting element means to regulate a quantity of light entering said room through said daylighting apparatus.

40. The daylighting apparatus of claim 37 wherein said means for controllably regulating is operable to regulate a position of said plurality of light reflecting element means absent simultaneously operating said plurality of light blocking element means.

41. The daylighting apparatus of claim 21 wherein each of said light reflecting element means further comprises:

azimuthal correction means formed on said top surface to redirect said incident sunlight received from a predetermined range of horizontal and vertical directions onto a predetermined region of a ceiling surface of said room.

42. The daylighting apparatus of claim 41 wherein said azimuthal correction means comprises:

a plurality of members projecting from said top surface and being of a geometry to redirect said incident sunlight received from a predetermined range of horizontal and vertical directions onto a predetermined region of a ceiling surface of said room.

43. The daylighting apparatus of claim 41 wherein said azimuthal correction means comprises:

features formed in said top surface and functioning to redirect said incident sunlight received from a predetermined range of horizontal and vertical directions onto a predetermined region of a ceiling surface of said room.

* * * * *

UNITED STATES PATENT AND TRADEMARK OFFICE
CERTIFICATE OF CORRECTION

PATENT NO. : 6,239,910 B1
APPLICATION NO. : 09/249664
DATED : May 29, 2001
INVENTOR(S) : Neall Edward Digert It is certified that error appears in the above-identified patent and that said Letters Patent is hereby corrected as shown below:

In the Specification at Column 1, line 4, the following language should be inserted:

STATEMENT REGARDING FEDERALLY SPONSORED RESEARCH OR DEVELOPMENT

This invention was made with Government support under Grant DE-FG03-97ER82331 awarded by the Department of Energy. The Government has certain rights in this invention.

Signed and Sealed this

Twelfth Day of August, 2008

JON W. DUDAS
*Director of the United States Patent and Trademark Office*